United States Patent
Qiu et al.

(10) Patent No.: US 12,360,755 B1
(45) Date of Patent: Jul. 15, 2025

(54) RTOS-BASED MULTI-APPLICATION DEVELOPMENT METHOD AND APPARATUS

(71) Applicant: SHENZHEN TOPWISE COMMUNICATION CO., LTD., Shenzhen (CN)

(72) Inventors: Jinqing Qiu, Shenzhen (CN); Xiangyong Zou, Shenzhen (CN)

(73) Assignee: SHENZHEN TOPWISE COMMUNICATION CO., LTD., Shenzhen (CN)

( * ) Notice: Subject to any disclaimer, the term of this patent is extended or adjusted under 35 U.S.C. 154(b) by 0 days.

(21) Appl. No.: 18/985,131

(22) Filed: Dec. 18, 2024

(30) Foreign Application Priority Data

Aug. 7, 2024 (CN) .......................... 202411075422.5

(51) Int. Cl.
*G06F 9/54* (2006.01)
*G06F 8/41* (2018.01)
(Continued)

(52) U.S. Cl.
CPC .................. *G06F 8/61* (2013.01); *G06F 8/41* (2013.01); *G06F 8/51* (2013.01)

(58) Field of Classification Search
CPC .................. G06F 8/41; G06F 8/61; G06F 8/51
See application file for complete search history.

(56) References Cited

U.S. PATENT DOCUMENTS

2019/0377621 A1  12/2019  Huang

FOREIGN PATENT DOCUMENTS

| CN | 111683005 B | 9/2020 |
|----|-------------|--------|
| CN | 105577813 A | 11/2020 |

(Continued)

OTHER PUBLICATIONS

Mahmoud Hussein Abdelkarem Abdelsamea, Real Time Operating Systems for the Internet of Things, Vision, Architecture and Research Directions, Published in: 2016 World Symposium on Computer Applications & Research (WSCAR) (2016, pp. 72-77) (Year: 2016).*

(Continued)

*Primary Examiner* — S. Sough
*Assistant Examiner* — Mohammad H Kabir
(74) *Attorney, Agent, or Firm* — JEEN IP LAW, LLC

(57) ABSTRACT

An RTOS-based, (Real-Time Operating System-based) multi-application development method and apparatus are provided. The method comprises: compiling and packaging an AWTK, (Toolkit Any Where) engine, a Jerryscript engine, and .c files through a GNU, (Gnu's Not Unix) compiler suite to generate a system.bin file; compiling and packaging xml files, js (JavaScript) files, and image files required by multiple applications through the AWTK engine to generate a fat.img containing the multiple applications; and burning the fat.img containing the multiple applications and the system.bin file into a POS (point of sale) machine with an RTOS. The Jerryscript engine and the AWTK engine support the development of JS language, then resource data (data) are generated from all images, XML (describing image elements and coordinates), and JS files used in the development of APPS, and finally, the resource data are compiled by GCC, (GNU Compiler Collection) to generate an APP.bin, thereby achieving multi-application development.

1 Claim, 6 Drawing Sheets

(51) Int. Cl.
*G06F 8/51* (2018.01)
*G06F 8/61* (2018.01)
*G06F 9/445* (2018.01)

(56) References Cited

FOREIGN PATENT DOCUMENTS

| | | |
|---|---|---|
| CN | 117348876 B | 1/2024 |
| CN | 117411906 A | 1/2024 |

OTHER PUBLICATIONS

Ji Chan Maeng, An RTOS API Translator for Model-Driven Embedded Software Development, 12th IEEE International Conference on Embedded and Real-Time Computing Systems and Applications (RTCSA'06) (2006, pp. 363-367) (Year: 2006).*

"ZLG open source GUI engine AWTK v1.3 shock release" ZLG ZLG Zhiyuan Electronics, https://mp.ofweek.com/ee/a645693420066, Dec. 6, 2019 (Dec. 6, 2019), pp. 1-2.

* cited by examiner

RTOS-BASED MULTI-APPLICATION DEVELOPMENT METHOD AND APPARATUS

CROSS-REFERENCE TO RELATED APPLICATIONS

This application claims priority to Chinese Patent Application No. 202411075422.5, filed on Aug. 7, 2024, which is hereby incorporated by reference in its entirety.

TECHNICAL FIELD

The present application relates to the field of computer technology, in particular to a real time operating system (RTOS)-based, (Real-Time Operating System)-based multi-application development method and apparatus.

BACKGROUND

A conventional point of sales (POS) machine involves single applications. The applications in the POS machine are built in by the POS manufacturer in the factory, that is, the built-in applications cannot be uninstalled or deleted by a seller or end user and can only be deleted by flashing new software provided by the POS manufacturer. On the other hand, software cannot be installed at will in the conventional POS machine, which greatly limits the scope of use of the conventional POS machine.

The applications in the conventional POS machine are mostly developed in C language. The C language has many advantages, such as good performance, good compatibility, and allowing direct access to hardware, but also has obvious disadvantages, such as pointer and memory management and high code complexity, making it difficult to develop applications, with relatively long cycle and high development costs. As time changes, more and more application developers are seeking simpler languages to develop applications, such as JAVA and JavaScript. There are also more and more practitioners who use the applications developed in these simple languages.

On this basis, the conventional POS machine has the following obvious disadvantages:

1. The conventional POS machine is unable to respond to user' new service requirements in a timely manner, and requires complex and time-consuming re-integration of application software by the manufacturer.

2. The end user cannot customize desired functions at will, while the functions must be developed and built in by the manufacturer.

3. The development of applications is difficult, time-consuming, and costly.

SUMMARY

The present application provides an RTOS-based multi-application development method and apparatus to solve the problem that the existing RTOS, (Real-Time Operating System) cannot be installed with multiple applications.

On the one hand, the present application provides an RTOS-based multi-application development method, including:

compiling and packaging an AWTK, (Toolkit Any Where) engine, a Jerryscript engine, a desktop manager, and an application market through a GNU, (Gnu's Not Unix) compiler suite to generate a system.bin file;

compiling and packaging xml files, js files, and image files required by each application through the AWTK engine to generate each app.bin; and packaging multiple app.bins to generate a fat.img containing multiple applications, burning the fat.img containing the multiple applications and the system.bin file into a POS machine with an RTOS, or uploading the multiple app.bins to an application market server.

On the other hand, the present application provides an RTOS-based multi-application development apparatus used for a POS machine with an RTOS, including:

a first compilation unit, configured to compile and package an AWTK engine, a Jerryscript engine, a desktop manager, and an application market through a GNU compiler suite to generate a system.bin file;

a first packaging unit, configured to compile and package xml files, js, (JavaScript) files, and image files required by each application through the AWTK engine to generate each app.bin; and a prefabrication unit, configured to package multiple app.bins to generate a fat.img containing multiple applications, and burn the fat.img containing the multiple applications and the system.bin file into the POS machine with the RTOS; or an upload unit, configured to upload the multiple app.bins to an application market server.

According to the RTOS-based multi-application development method and apparatus provided in the present application, the Jerryscript engine and the AWTK engine support the development of JS language, then resource data (data) are generated from all images, XML (describing image elements and coordinates), and JS files used in the development of APPS, and finally, the resource data are compiled by GCC, (GNU Compiler Collection) to generate an APP.bin, thereby achieving multi-application development.

BRIEF DESCRIPTION OF DRAWINGS

The accompanying drawings here are incorporated into the specification and constitute a part of the specification, show embodiments consistent with the present application, and are used with the specification to explain the principle of the present application.

Figure 1:
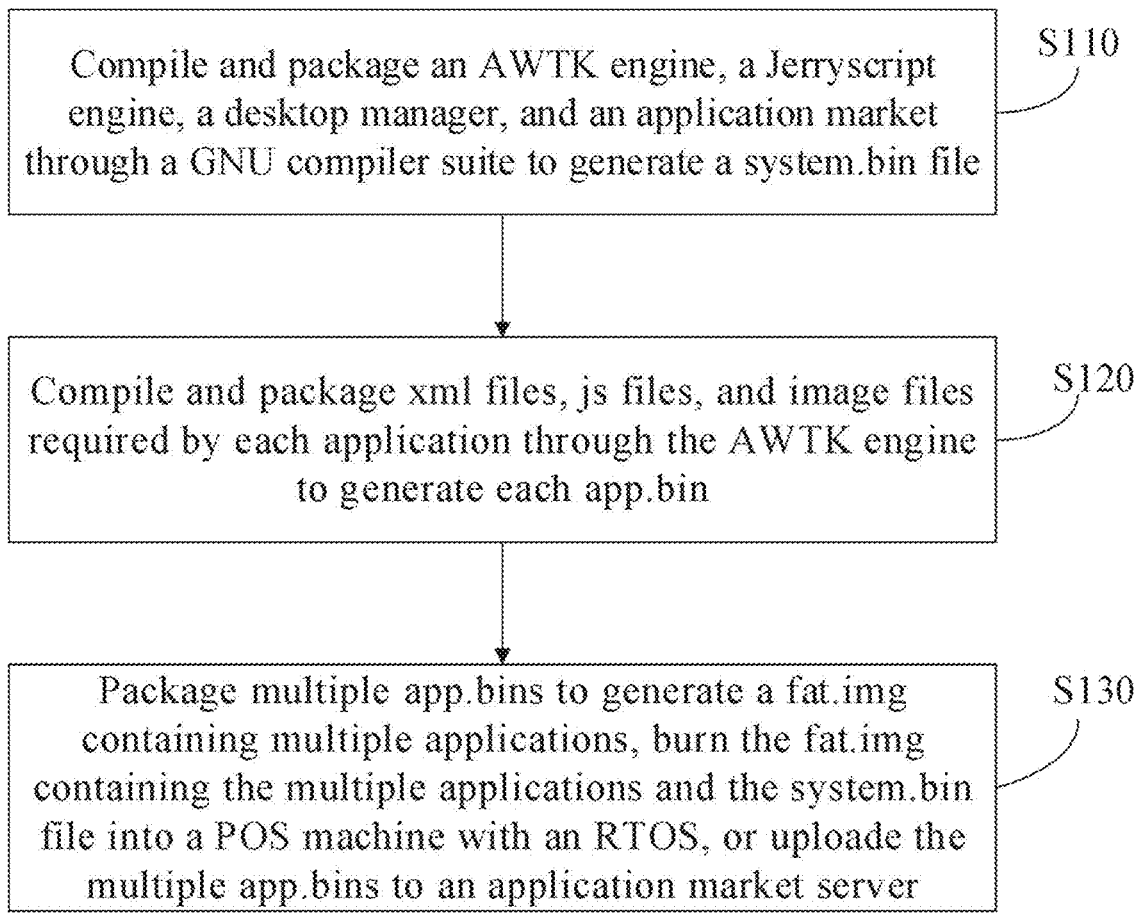
FIG. 1 is a flowchart of an RTOS-based multi-application development method provided in an embodiment of the present invention.

Specific embodiments of the present application are shown by the above drawings, and more detailed description will be provided below. These drawings and text description are not for limiting the scope of the concept of the present application in any way, but for illustrating the concept of the present application for those skilled in the art by referring to the specific embodiments.

DESCRIPTION OF EMBODIMENTS

Example embodiments will be described in detail, examples of which are illustrated in the accompanying drawings. When the following description refers to the accompanying drawings, the same reference numerals in different drawings represent the same or similar elements, unless otherwise indicated. Implementations described in the following example embodiments do not represent all implementations consistent with the present application. On the contrary, the implementations are merely examples of an apparatus and a method consistent with some aspects of the present application described in detail in claims.

The technical terms involved in the present invention are explained:

Firstly, in the embodiments of the present invention, a platform needs to support the development of applications in JavaScript language, the syntax of JavaScript is very simple and easy to learn and understand, and JavaScript is an interpreted language that can be run directly without participating in compilation, making the development and debugging very convenient.

Secondly, in the embodiments of the present invention, the platform needs to support the installation, uninstallation, and upgrade of applications. When a user develops an application, the application does not need to be integrated or burnt by a manufacturer. Instead, multiple applications to be developed by the user are packaged through a specific tool to generate a bin file and the bin file is uploaded to a server. Then, a client installs the required application through an application market, which is very convenient. In this way, multiple applications can be loaded, run, installed, and deleted on a conventional POS machine.

JS language is a lightweight, interpreted, or just-in-time compiled programming language with function priority. An engine, such as V8 engine or SpiderMonkey engine, is required to support the JS language. Such an engine requires a large RAM or ROM and a powerful CPU. However, the existing single-chip POS is very limited in the space of ROM or RAM and the dominant frequency of CPU, which are not enough to support such a large engine.

Figure 3:
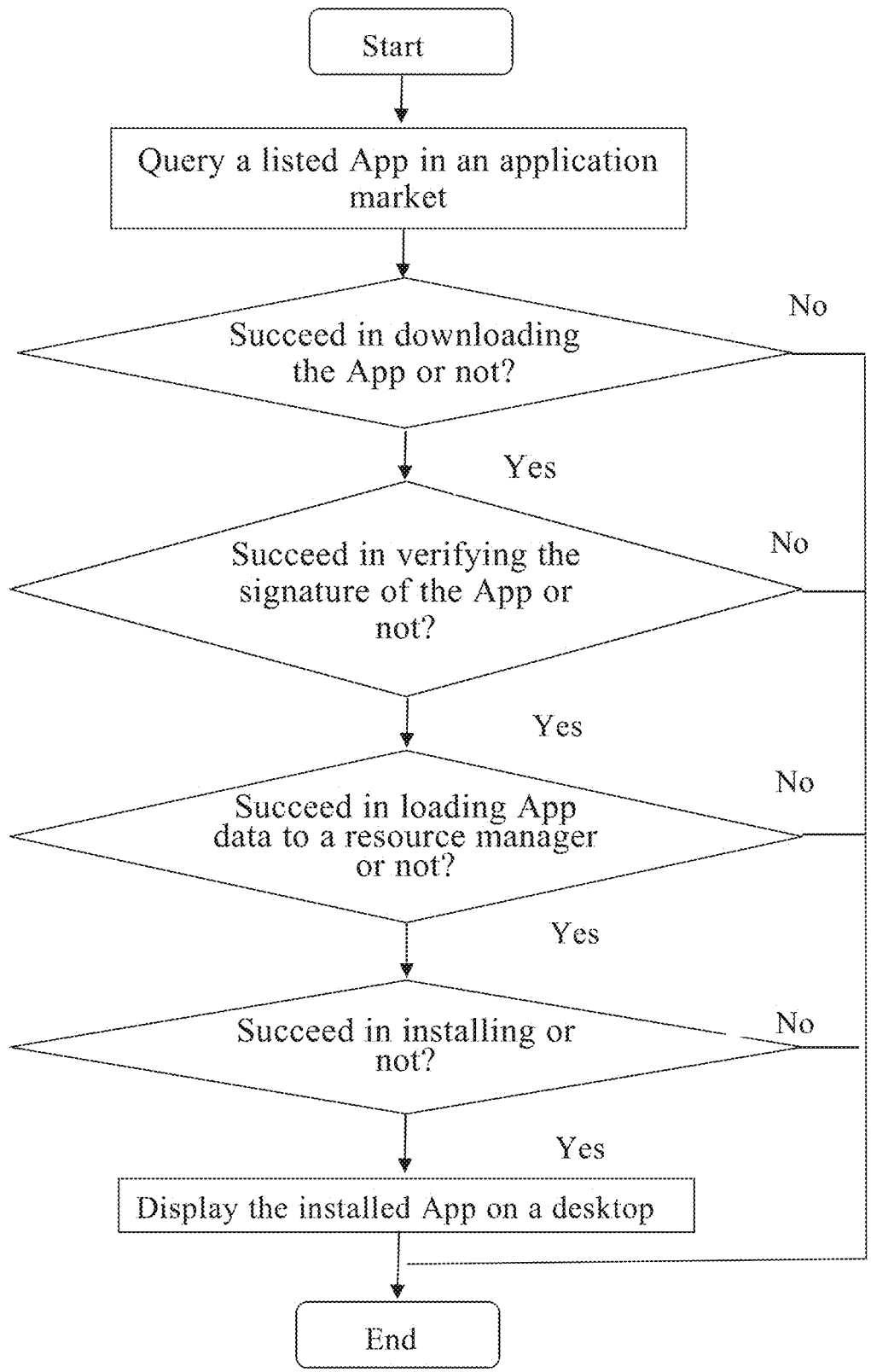
FIG. 3 is a flowchart illustrating that a client downloads and installs an App through an application market according to an embodiment of the present invention.

The present invention makes improvement on the original basis. The present invention develops a desktop manager for displaying installed application icons. Then, multiple applications are loaded and run by dynamically loading resources, as shown in FIG. 3.

The embodiments of the present invention provide an RTOS-based multi-application development method. In the embodiments of the present invention, applications are developed in relatively simple languages, users can freely develop desired applications, and the applications do not need to be built in or burnt by manufacturers but are downloaded from an application store and installed.

Embodiment 1

FIG. 1 is a flowchart of an RTOS-based multi-application development method provided in an embodiment of the present invention. With reference to FIG. 1, the present invention provides an RTOS-based multi-application development method, including:

Step S110: Compile and package an AWTK engine, a Jerryscript engine, and .c files through a GNU compiler suite to generate a system.bin file;

In a case of relatively limited resources of an existing single-chip POS, the present invention uses a more simplified JS engine, namely, the Jerryscript engine, which can run on a device with ROM greater than 200K and RAM greater than 64K. The existing single-chip POS can fully meet this requirement. In terms of GUI, the present invention uses the AWTK engine, which provides a GUI engine that has powerful functions, is efficient, reliable, and easy to use, can easily create cool effects, and supports cross-platform synchronous development. In terms of development language, the GUI engine supports the development in both C language and JS language. If the JS language is used for development, a JS engine is required to support the GUI engine. The present invention uses the Jerryscript engine and the AWTK engine to support users in developing their acquiring applications in JS language.

Step S120: Compile and package xml files, js files, and image files required by multiple applications through the AWTK engine to generate a fat.img containing the multiple applications;

Step S130: Burn the fat.img containing the multiple applications and the system.bin file into a POS machine with an RTOS.

The existing AWTK engine supports the development of single applications in JS language. A user can compile all images, XML (describing image elements and coordinates), and JS files used by the AWTK engine, the Jerryscript engine, and APPs to generate resource data (data data), and all the data are compiled by GCC to generate an APP.bin file, which is then burned into a flash. The existing development methods support neither installing new applications through an application market, nor uninstalling them.

According to the RTOS-based multi-application development method provided in the embodiments of the present invention, an AWTK engine, a Jerryscript engine, a desktop manager, and an application market are compiled together to generate a system.bin file; all xml files, image files, and js files used by a user to develop applications are packaged to generate APP.bins, and the multiple APP.bins can be packaged into a fat.img and burned by a tool, or the multiple APP.bins can be uploaded to a TMS server (also understood as an application market server); and then an application market client in the system.bin can download and install the app on the TMS server.

Figure 2:
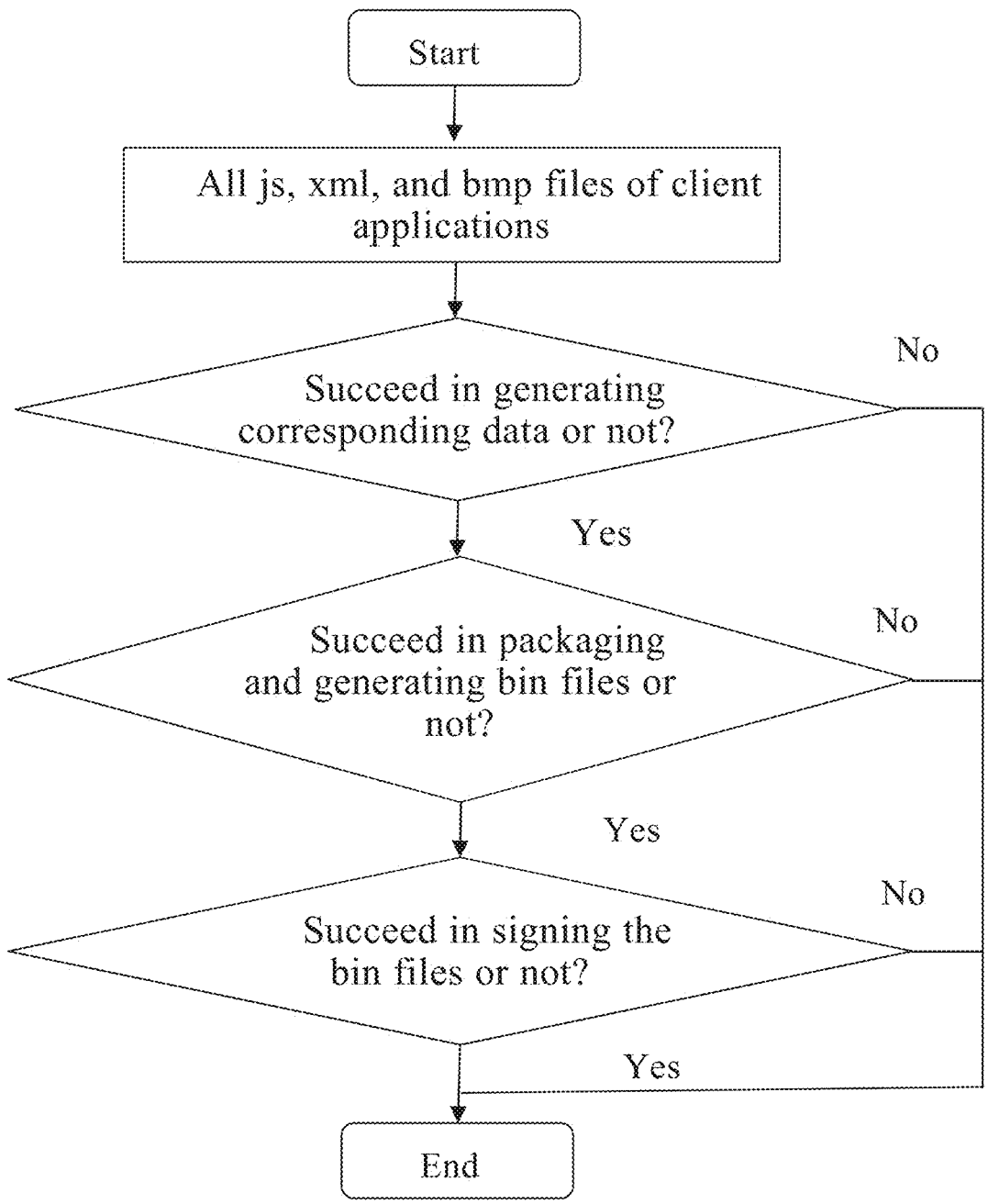
FIG. 2 is a flowchart of step S120 provided in an embodiment of the present invention.
Figure 4:
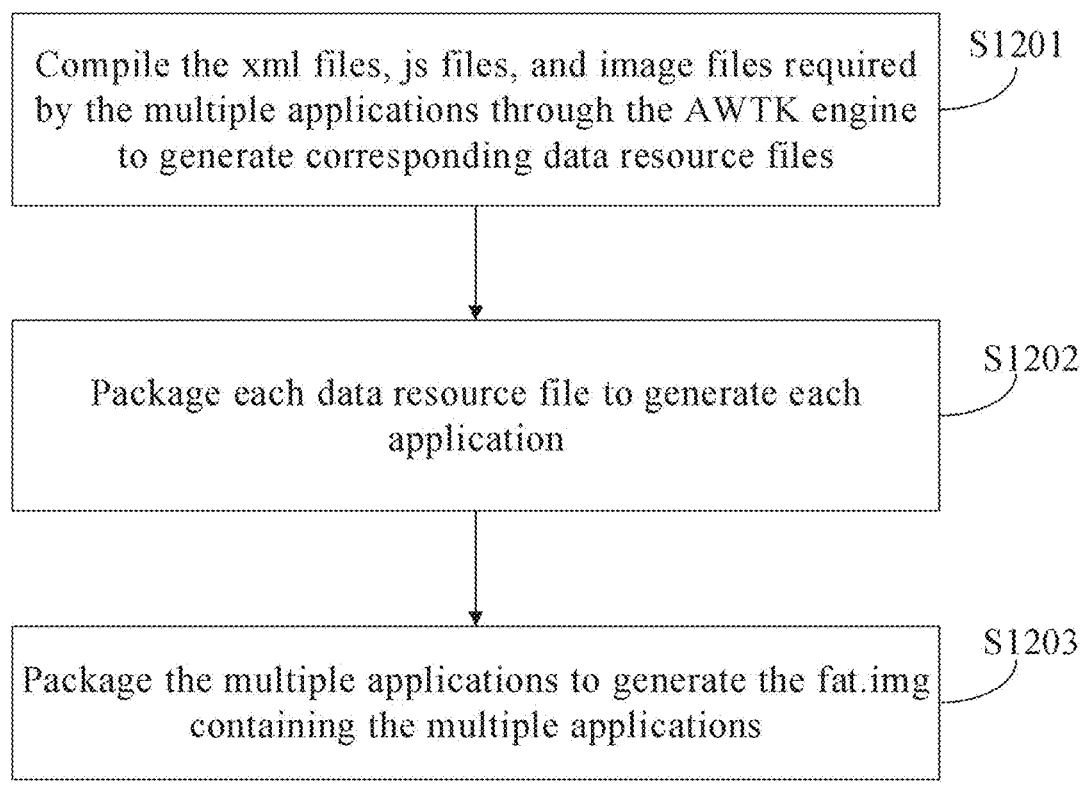
FIG. 4 is a flowchart of step S120 provided in an embodiment of the present invention.

FIG. 2 and FIG. 4 are flowcharts of step S120 provided in an embodiment of the present invention.

As shown in FIG. 2 and FIG. 4, step S120 of generating a fat.img containing the multiple applications in the embodiment of the present invention includes:

Step S1201: Compile the xml files, js files, and image files required by the multiple applications through the AWTK engine to generate corresponding data resource files;

Step S1202: Package each data resource file to generate each application;

Step S1203: Package the multiple applications to generate the fat.img containing the multiple applications.

FIG. 3 is a flowchart illustrating that a client downloads and installs an App through an application market according to an embodiment of the present invention.

As shown in FIG. 3, in the embodiment of the present invention, developed single-chip POS machine client programs are burnt into a flash, and the JS_APP.bin is downloaded and installed through the developed application market application. The specific steps are as follows:

1. Convert, by an AWTK GUI, (Toolkit Any Where, Graphical User Interface) tool, all xml files, image files, js files, and other files used by the developed desktop manager application and application market application into data files that AWTK GUI can recognize.

2. Compile the above data files, AWTK GUI, Jerryscript engine, and other .c files to generate a .bin file (system.bin) using GCC, and burn the .bin file into a designated flash location of the single-chip POS machine using a tool.

3. Run the system, activate the AWTK GUI and Jerryscript engines, load the above data into the AWTK GUI resource manager, and enter the desktop manager application.

4. Enter the application market application through the desktop manager. The application market application obtains, through an HTTP protocol, all JS APP information that the TMS server needs to install. Display these JS APPs that need to be installed in the application market application in a list.

5. Download the JS APP that the user desires to install from the TMS server to an external file system of the single-chip POS machine through the HTTP protocol.

6. Use an SHA256 algorithm to verify a signature of the downloaded JS APP file.

7. Copy the JS APP file downloaded to the external file system to a built-in file system of the single-chip POS machine.

8. Read the content of the JS APP copied to the built-in file system into a memory of the single-chip POS machine and load the content into a resource manager of the AWTK GUI engine.

The application market notifies the desktop manager to update the UI and display the JS APP copied to the built-in file system.

Specifically, the method for installing and loading multiple applications includes:
- obtaining, through a network interface, a list of JS APPs that need to be installed on the server; analyzing downloaded uniform resource locators (URLs) and downloading the JS APPs to the external file system;
- calculating Hashs of the JS APPs and verifying signatures of the JS APPs; copying the JS APPs to the built-in file system;
- analyzing JS APP data and loading file data such as xml, icon, and js in the JS APPs into the AWTK resource manager; and
- managing the running of multiple applications through the desktop manager, and removing resources of a current front-end application from the AWTK resource manager when activating a new application.

The RTOS-based multi-application development method provided in the embodiments of the present invention supports the development of applications in JavaScript language, the syntax of JavaScript is very simple and easy to learn and understand, and JavaScript is an interpreted language that can be run directly without participating in compilation, making the development and debugging very convenient. Therefore, the difficulty of developing programs is greatly reduced, and the development cycle is shortened.

The RTOS-based multi-application development method provided in the embodiments of the present invention supports the installation, uninstallation, and upgrade of applications. When a user develops an application, the application does not need to be integrated or burnt by a manufacturer. Instead, the application developed by the user is packaged through a specific tool to generate a bin file and the bin file is uploaded to a server. Then, a client installs the required application through an application market, which is very convenient. In this way, multiple applications can be loaded, run, installed, and deleted on a conventional POS machine. The application installation, upgrade, and uninstallation functions supported by the present invention make it more convenient for the user to develop desired applications and improve the efficiency of application integration.

When the user uses applications, developed single-chip POS machine client programs are burnt into a flash, and the JS_APP.bin is downloaded and installed through the developed application market application. The specific steps are as follows:

1. Convert, by an AWTK GUI tool, all xml files, image files, js files, and other files used by the developed desktop manager application and application market application into data files that AWTK GUI can recognize.

2. Compile the above data files, AWTK GUI, Jerryscript engine, and other .c files to generate a .bin file (system.bin) using GCC, and burn the .bin file into a designated flash location of the single-chip POS machine using a tool.

3. Run the system, activate the AWTK GUI and Jerryscript engines, load the above data into the AWTK GUI resource manager, and enter the desktop manager application.

4. Enter the application market application through the desktop manager. The application market application obtains, through an HTTP protocol, all JS APP information that the TMS server needs to install. Display these JS APPs that need to be installed in the application market application in a list.

5. Download the JS APP that the user desires to install from the TMS server to an external file system of the single-chip POS machine through the HTTP protocol.

6. Use an SHA256 algorithm to verify a signature of the downloaded JS APP file.

7. Copy the JS APP file downloaded to the external file system to a built-in file system of the single-chip POS machine.

8. Read the content of the JS APP copied to the built-in file system into a memory of the single-chip POS machine and load the content into a resource manager of the AWTK GUI engine.

The application market notifies the desktop manager to update the UI and display the JS APP copied to the built-in file system.

Figure 5:
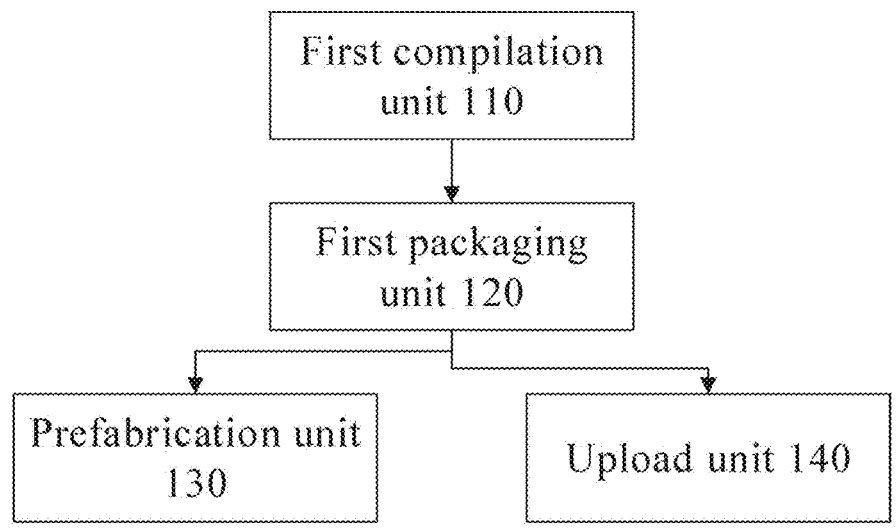
FIG. 5 is a structural diagram of an RTOS-based multi-application development apparatus provided in an embodiment of the present invention.

FIG. 5 is a structural diagram of an RTOS-based multi-application development apparatus provided in an embodiment of the present invention. With reference to FIG. 5, the present invention provides an RTOS-based multi-application development apparatus used for a POS machine with an RTOS, including:
- a first compilation unit 110, configured to compile and package an AWTK engine, a Jerryscript engine, and .c files through a GNU compiler suite to generate a system.bin file;
- a first packaging unit 120, configured to compile and package xml files, js files, and image files required by multiple applications through the AWTK engine to generate a fat.img containing the multiple applications;
- a prefabrication unit 130, configured to package multiple app.bins to generate a fat.img containing multiple applications, and burn the fat.img containing the multiple applications and the system.bin file into the POS machine with the RTOS; or
- an upload unit 140, configured to upload the multiple app.bins to an application market server.

Figure 6:
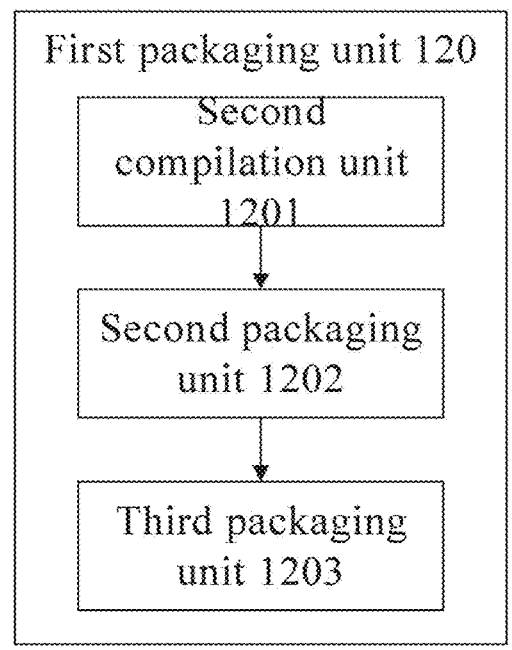
FIG. 6 is a structural diagram of a first packaging unit 120 provided in an embodiment of the present invention.

FIG. 6 is a structural diagram of the first packaging unit 120 provided in an embodiment of the present invention. With reference to FIG. 6, the first packaging unit 120 provided in the embodiment of the present invention includes:
- a second compilation unit 1201, configured to compile the xml files, js files, and image files required by the multiple applications through the AWTK engine to generate corresponding data resource files;

a second packaging unit 1202, configured to package each data resource file to generate each application; and a third packaging unit 1203, configured to package the multiple applications to generate the fat.img containing the multiple applications.

The RTOS-based multi-application development apparatus provided in the embodiments of the present invention supports the development of applications in JavaScript language, the syntax of JavaScript is very simple and easy to learn and understand, and JavaScript is an interpreted language that can be run directly without participating in compilation, making the development and debugging very convenient. Therefore, the difficulty of developing programs is greatly reduced, and the development cycle is shortened.

The RTOS-based multi-application development method provided in the embodiments of the present invention supports the installation, uninstallation, and upgrade of applications. When a user develops an application, the application does not need to be integrated or burnt by a manufacturer. Instead, the application developed by the user is packaged through a specific tool to generate a bin file and the bin file is uploaded to a server. Then, a client installs the required application through an application market, which is very convenient. In this way, multiple applications can be loaded, run, installed, and deleted on a conventional POS machine. The application installation, upgrade, and uninstallation functions supported by the present invention make it more convenient for the user to develop desired applications and improve the efficiency of application integration.

It should be understood that the present application is not limited to the precise structure described above and shown in the accompanying drawings, and various modifications and changes can be made without departing from the scope of the present application. The scope of the present application is limited only by the appended claims.

What is claimed is:

1. A Real-Time Operating System (RTOS)-based multi-application development method, comprising:

compiling and packaging a Toolkit Any Where (AWTK) engine, a Jerryscript engine, a desktop manager, and an application market through a Gnu's Not Unix (GNU) compiler suite to generate a system.bin file;

compiling and packaging xml files, JavaScript (js) files and image files required by each application through the AWTK engine to generate each app.bin; and packaging multiple app.bins to generate a fat.img containing multiple applications, burning the fat.img containing the multiple applications and the system.bin file into a point of sale (POS) machine with an RTOS, or uploading the multiple app.bins to an application market server;

the generating the fat.img containing the multiple applications comprises:

compiling the xml files, the js files, and the image files required by the multiple applications through the AWTK engine to generate corresponding data resource files;

packaging each data resource file to generate each application;

packaging the multiple applications to generate the fat.img containing the multiple applications;

burning developed single-chip POS machine client programs into a flash, downloading and installing a JS_APP.bin through a developed application market application, converting, by a Toolkit Any Where, Graphical User Interface (AWTK GUI) tool, the xml files, the image files, the js files and other files used by a developed desktop manager application and the application market application into data files that the AWTK GUI to recognize;

compiling data files, the AWTK GUI, the Jerryscript engine and other .c files to generate a .bin file (system.bin) using GNU Compiler Collection (GCC) and burning the .bin file into a designated flash location of the single-chip POS machine using a tool;

running a system, activating the AWTK GUI and the Jerryscript engine, loading the data into an AWTK GUI resource manager, and entering the desktop manager application;

entering the application market application through the desktop manager, the application market application being obtained, through an HTTP protocol, all JS APP information that a Terminal Management System (TMS) server needs to install; displaying JS APP that need to be installed in the application market application in a list;

downloading the JS APP that need to be installed from the TMS server to an external file system of the single-chip POS machine through the HTTP protocol;

using an SHA256 algorithm to verify a signature of downloaded JS APP file;

copying the JS APP file downloaded to the external file system to a built-in file system of the single-chip POS machine; and reading content of the JS APP copied to the built-in file system into a memory of the single-chip POS machine and loading the content into a resource manager of an AWTK GUI engine.

* * * * *